(12) United States Patent
Kitou et al.

(10) Patent No.: US 11,111,401 B2
(45) Date of Patent: Sep. 7, 2021

(54) LIGHT CURING MOLDING INK SET, AND METHOD FOR MANUFACTURING LIGHT CURED ARTICLE

(71) Applicants: Maxell Holdings, Ltd., Kyoto (JP); MIMAKI ENGINEERING CO., LTD., Nagano (JP)

(72) Inventors: Katsuyuki Kitou, Osaka (JP); Taeko Izumo, Osaka (JP); Masakatsu Okawa, Nagano (JP); Kenta Hongo, Nagano (JP)

(73) Assignees: MAXELL HOLDINGS, LTD., Kyoto (JP); MIMAKI ENGINEERING CO., LTD., Nagano (JP)

( * ) Notice: Subject to any disclaimer, the term of this patent is extended or adjusted under 35 U.S.C. 154(b) by 441 days.

(21) Appl. No.: 15/759,796

(22) PCT Filed: Sep. 15, 2016

(86) PCT No.: PCT/JP2016/077255
§ 371 (c)(1),
(2) Date: Mar. 13, 2018

(87) PCT Pub. No.: WO2017/047692
PCT Pub. Date: Mar. 23, 2017

(65) Prior Publication Data
US 2018/0265720 A1    Sep. 20, 2018

(30) Foreign Application Priority Data
Sep. 15, 2015  (JP) .............................. JP2015-181573

(51) Int. Cl.
*B33Y 10/00*    (2015.01)
*C09D 11/101*    (2014.01)
(Continued)

(52) U.S. Cl.
CPC .......... *C09D 11/101* (2013.01); *B29C 64/112* (2017.08); *B29C 64/40* (2017.08);
(Continued)

(58) Field of Classification Search
CPC ......... B33Y 10/00; B33Y 70/00; B29C 64/40; B29C 64/112
(Continued)

(56) References Cited

U.S. PATENT DOCUMENTS 8,541,072 B2    9/2013  Foley et al.
2004/0175451 A1    9/2004  Maekawa et al.
(Continued)

FOREIGN PATENT DOCUMENTS

CN    1526542 A    9/2004
CN    103189187 A    7/2013
(Continued)

OTHER PUBLICATIONS

Extended Search Report issued in corresponding European Patent Application No. 16846563.1-1102, dated May 14, 2019.
(Continued)

*Primary Examiner* — Jeffrey M Wollschlager
*Assistant Examiner* — Xue H Liu
(74) *Attorney, Agent, or Firm* — McDermott Will & Emery LLP

(57) ABSTRACT

There is provided a light curing molding ink set used for a manufacturing method for light curing molding using an ink-jet scheme, comprising a combination of a resin composition for a modeling material used for shaping the modeling material and a resin composition for a supporting material used for shaping the supporting material, wherein surface tension Mt (mN/m) of the resin composition for a modeling material is greater than surface tension St (mN/m) of the resin composition for a supporting material, and the
(Continued)

surface tension Mt and the surface tension St satisfy the [0<Mt −St<5] expression, and this light curing molding ink set can afford a light cured article having the good dimensional accuracy.

15 Claims, 4 Drawing Sheets

(51) Int. Cl.
  B33Y 70/00 (2020.01)
  B41M 5/00 (2006.01)
  B29C 67/00 (2017.01)
  B29C 64/112 (2017.01)
  B29C 64/40 (2017.01)
  C09D 11/107 (2014.01)
  C09D 11/30 (2014.01)
  C09D 11/322 (2014.01)
  B29K 33/00 (2006.01)
  B29K 71/00 (2006.01)
(52) U.S. Cl.
  CPC .............. B29C 67/00 (2013.01); B33Y 10/00 (2014.12); B33Y 70/00 (2014.12); B41M 5/00 (2013.01); C09D 11/107 (2013.01); C09D 11/30 (2013.01); C09D 11/322 (2013.01); B29K 2033/08 (2013.01); B29K 2071/02 (2013.01); B29K 2071/12 (2013.01)
(58) Field of Classification Search
  USPC ........................................................ 264/494
  See application file for complete search history.

(56) References Cited

U.S. PATENT DOCUMENTS

| | | | |
|---|---|---|---|
| 2008/0105818 | A1 | 5/2008 | Cohen |
| 2013/0127963 | A1 | 5/2013 | Pratt et al. |
| 2013/0234370 | A1 | 9/2013 | Suzuki et al. |
| 2014/0248473 | A1 | 9/2014 | Makuta |
| 2016/0115297 | A1 | 4/2016 | Norikane et al. |
| 2017/0252971 | A1 | 9/2017 | Umebayashi |
| 2017/0283631 | A1 | 10/2017 | Paul et al. |
| 2018/0079923 | A1 | 3/2018 | Umebayashi |
| 2018/0291219 | A1 | 10/2018 | Kiyosada |
| 2019/0358892 | A1 | 11/2019 | Kito et al. |
| 2019/0359841 | A1 | 11/2019 | Kito et al. |
| 2020/0407581 | A1 | 12/2020 | Kito et al. |

FOREIGN PATENT DOCUMENTS

| | | |
|---|---|---|
| EP | 2 088 176 A1 | 8/2009 |
| EP | 2 532 719 A2 | 12/2012 |
| EP | 2 636 511 A1 | 9/2013 |
| EP | 3 305 508 A1 | 4/2018 |
| JP | H06-220148 A | 8/1994 |
| JP | 2004-002616 A | 1/2004 |
| JP | 2004-255839 A | 9/2004 |
| JP | 2004-291625 A | 10/2004 |
| JP | 2005-243219 A | 9/2005 |
| JP | 2007-161740 A | 6/2007 |
| JP | 2009-196274 A | 9/2009 |
| JP | 2010-155889 A | 7/2010 |
| JP | 2010-155926 A | 7/2010 |
| JP | 2011-173981 A | 9/2011 |
| JP | 2012-111226 A | 6/2012 |
| JP | 2013-076005 A | 4/2013 |
| JP | 2015-010168 A | 1/2015 |
| JP | 2015-038166 A | 2/2015 |
| JP | 2015-078255 A | 4/2015 |
| JP | 2015-123684 A | 7/2015 |
| JP | 2016-117273 A | 6/2016 |
| JP | 2016-117902 A | 6/2016 |
| WO | 03/029365 A1 | 4/2003 |
| WO | 2015/056614 A1 | 4/2015 |
| WO | 2016/121587 A1 | 8/2016 |
| WO | 2017/018453 A1 | 2/2017 |

OTHER PUBLICATIONS

Chinese Office Action issued in corresponding Chinese Patent Application No. 201680053320.0, dated May 8, 2019, with English Translation.
Extended European Search Report issued in corresponding European Patent Application No. 16846564.9-1107, dated Apr. 18, 2019.
Chinese Office Action issued in corresponding Chinese Patent Application No. 201680053265.5, dated May 15, 2019, with English Translation.
Search Report issued in corresponding International Patent Application No. PCT/JP2016/077255, dated Nov. 1, 2016.
Extended European Search Report issued a corresponding European Patent Application No. 16830558.9-1107, dated Jun. 14, 2019.
Communication Pursuant to Article 94(3) EPC issued in corresponding European Patent Application No. 16846563.1, dated Jan. 13, 2020.
Partial Supplemental European Search Report issued in corresponding European Patent Application No. 16830558.9, dated Feb. 18, 2019.
Search Report issued in corresponding International Patent Application No. PCT/JP2016/072038, dated Oct. 4, 2016.
International Preliminary Report on Patentability issued in corresponding International Patent Application No. PCT/JP2016/072038, dated Jan. 30, 2018.
International Preliminary Report on Patentability issued in corresponding International Patent Application No. PCT/JP2016/077256, dated Mar. 20, 2018.
Japanese Notice of Reasons for Refusal issued in corresponding Japanese Patent Application No. 2015-149753, dated Oct. 15, 2019, with English translation.
International Preliminary Report on Patentability received in corresponding International Patent Application No. pCT/JP2016/077255, dated Mar. 20, 2018.
Chinese Office Action issued in corresponding Chinese Patent Application No. 201680053320.0, dated Aug. 31, 2020, with English Translation.
U.S. PTO Restriction Requirement issued in related U.S. Appl. No. 15/748,082, dated Jul. 29, 2020.
Chinese Office Action issued in corresponding Chinese Patent Application No. 201680044098.8, dated Jun. 1, 2020, with English translation.
U.S. PTO Restriction Requirement issued in related U.S. Appl. No. 15/759,807, dated Jun. 11, 2020.
Extended European Search Report issued in corresponding European Patent Application No. 20161752.9-1107, dated Jun. 29, 2020.
Chinese Office Action issued in corresponding Chinese Patent Application No. 201680044098.8, dated Aug. 26, 2020, with English translation.
Chinese Office Action issued in corresponding Chinese Patent Application No. 201680053265.5, dated Aug. 31, 2020, with English Translation.
U.S. PTO Non-Final Office issued in related U.S. Appl. No. 15/748,082, dated Jan. 6, 2021.
U.S. PTO Non-Final Office issued in related U.S. Appl. No. 15/759,807, dated Jan. 29, 2021.
Chinese Decision of Rejection issued in Chinese Patent Application No. 201680044098.8, dated Mar. 1, 2021, with English translation from related U.S. Appl. No. 15/748,082.
U.S. PTO Final Office Action issued in related U.S. Appl. No. 15/748,082, dated Jul. 1, 2021.

LIGHT CURING MOLDING INK SET, AND METHOD FOR MANUFACTURING LIGHT CURED ARTICLE

CROSS REFERENCE

This application is the U.S. National Phase under 35 U.S.C. § 371 of International Application No. PCT/JP2016/077255, filed on Sep. 15, 2016, which claims the benefit of Japanese Application No. 2015-181573, filed on Sep. 15, 2015, the entire contents of each are hereby incorporated by reference.

TECHNICAL FIELD

The present invention relates to a light curing molding ink set used in a manufacturing method for light curing molding using an ink-jet scheme, and a method for manufacturing a light cured article using the light curing molding ink set.

BACKGROUND ART

Conventionally, as a method for making a stereoscopically shaped product, a shaping method using a photocurable resin composition which cures by irradiating ultraviolet rays or the like has widely been known. Specifically, in such a shaping method, a cured layer having a predetermined shape is formed by irradiating the photocurable resin composition with ultraviolet rays or the like to cure it. Thereafter, a new cured layer is formed by further feeding the photocurable resin composition on the cured layer to cure it. By repeatedly performing the step as described above, a stereoscopically shaped product is made.

Among the shaping methods as described above, in recent years, there has been reported a light curing molding method according to an ink-jet system by discharging the photocurable resin composition from a nozzle, irradiating ultraviolet rays or the like immediately after the discharge to cure it, thereby, forming a cured layer having a predetermined shape (hereinafter referred to as manufacturing method for light curing molding using an ink-jet scheme) (JP-A-2004-255839, JP-A-2010-155889, JP-A-2010-155926 and JP-A-2012-111226). The manufacturing method for light curing molding using an ink-jet scheme does not need installation of a large-scale resin liquid tank for storing the photocurable resin composition and a darkroom. For that reason, a shaping apparatus can be miniaturized as compared with the conventional method. The manufacturing method for light curing molding using an ink-jet scheme has been paid attention as a shaping method which is realized by a 3D printer that can freely make a stereoscopically shaped product, based on CAD (Computer Aided Design) data.

In the manufacturing method for light curing molding using an ink-jet scheme, when a light cured article having a complicated shape such as a hollow shape is shaped, in order to support a modeling material, the modeling material and a supporting material are formed in combination (JP-A-2004-255839, JP-A-2010-155889 and JP-A-2012-111226). The supporting material is made by irradiating the photocurable resin composition with ultraviolet rays or the like to cure it, like the modeling material. After the modeling material has been made, the supporting material can be removed by physically peeling the supporting material, or dissolving the supporting material in an organic solvent or water.

In the manufacturing method for light curing molding using an ink-jet scheme using the modeling material and the supporting material, the cured layer is formed, for example, by the following method. First, by discharging a resin composition for a modeling material and a resin composition for a supporting material from an ink-jet head, a resin composition layer in which a layer composed of the resin composition for a modeling material and the resin composition for a supporting material are contiguous is formed. And, in order to smooth an upper surface of the resin composition layer, a roller is used to remove the extra resin composition for a modeling material and resin composition for a supporting material. Finally, by irradiating these resin compositions with light using a light source, the resin compositions are cured. Thereby, a cured layer comprising the modeling material and the supporting material is formed.

SUMMARY OF THE INVENTION

Problems to be Solved by the Invention

However, the conventional light cured article which is obtained by using the resin composition for a modeling material and the resin composition for a supporting material had a problem that the dimensional accuracy is reduced.

The present invention was made in view of the above-mentioned present situation, and an object thereof is to provide a light curing molding ink set by which a light cured article having the good dimensional accuracy can be obtained, and a method for manufacturing a light cured article using the light curing molding ink set.

Solutions to the Problems

The present inventors intensively studied the cause for reduction in the dimensional accuracy of the light cured article. As a result, the present inventors obtained the finding that in the light cured article having the reduced dimensional accuracy, by movement of one of the resin composition for a modeling material and the resin composition for a supporting material to the other side at an interface between the layer composed of the resin composition for a modeling material and the layer composed of the resin composition for a supporting material, blur (bleeding) is generated at the interface. That is, the present inventors obtained the finding that bleeding which is generated at the interface between the layer composed of the resin composition for a modeling material and the layer composed of the resin composition for a supporting material is one of the causes for reduction in the dimensional accuracy of the light cured article.

The present invention was made based on the above-mentioned finding, and the gist thereof is as follows:

[1] A light curing molding ink set used for a manufacturing method for light curing molding using an ink-jet scheme, comprising a combination of a resin composition for a modeling material used for shaping the modeling material and a resin composition for a supporting material used for shaping the supporting material, wherein surface tension Mt (mN/m) of the resin composition for a modeling material is greater than surface tension St (mN/m) of the resin composition for a supporting material, and the surface tension Mt and the surface tension St satisfy the following (i) expression.

$$0 < Mt - St < 5 \tag{i}$$

Effects of the Invention

According to the present invention, there can be provided a light curing molding ink set by which a light cured article having the good dimensional accuracy can be obtained, and a method for manufacturing a light cured article using the light curing molding ink set.

BRIEF DESCRIPTION OF THE DRAWINGS

FIG. 6 (b) is a line A-A cross-sectional view of FIG. 6 (a).

EMBODIMENTS OF THE INVENTION

Figure 1:
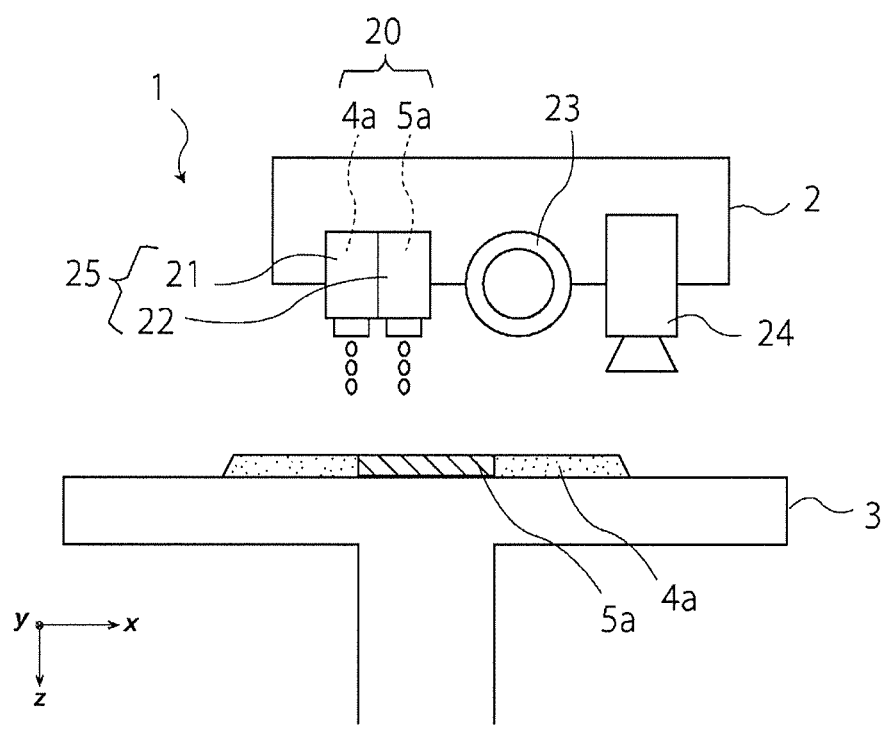
FIG. 1 is a view schematically showing a step (I) in the method for manufacturing a light cured article of the present embodiment.

One embodiment of the present invention (hereinafter, also referred to as present embodiment) will be illustrated in detail below. The present invention is not limited to the following contents. In addition, in the following illustration, "(meth)acrylate" is a generic name of acrylate and methacrylate, and means one or both of acrylate and methacrylate. This also applies to "(meth)acryloyl" and "(meth)acryl".

[1] The light curing molding ink set of the present embodiment is a light curing molding ink set used for a manufacturing method for light curing molding using an ink-jet scheme, comprising a combination of a resin composition for a modeling material used for shaping the modeling material and a resin composition for a supporting material used for shaping the supporting material, wherein surface tension Mt (mN/m) of the resin composition for a modeling material is greater than surface tension St (mN/m) of the resin composition for a supporting material, and the surface tension Mt and the surface tension St satisfy the following (i) expression.

$$0 < Mt - St < 5 \quad (i)$$

[2] In the light curing molding ink set according to [1], the surface tension Mt is 26.0 to 33.3 mN/m.

[3] In the light curing molding ink set according to [1] or [2], the resin composition for a modeling material contains a water-insoluble monofunctional ethylenic unsaturated monomer (A), a di- or more-functional polyfunctional ethylenic unsaturated monomer (B), a photopolymerization initiator (C), and a surface adjusting agent (D),

[4] In the light curing molding ink set according to [3], the content of the (A) component is 19 to 49 parts by weight, based on 100 parts by weight of the whole resin composition for a modeling material.

[5] In the light curing molding ink set according to [3] or [4], the content of the (B) component is 15 to 60 parts by weight, based on 100 parts by weight of the whole resin composition for a modeling material.

[6] In the light curing molding ink set according to any one of [3] to [5], the content of the (A) component is 19 to 49 parts by weight, based on 100 parts by weight of the whole resin composition for a modeling material, and the content of the (B) component is 15 to 60 parts by weight, based on 100 parts by weight of the whole resin composition for a modeling material.

[7] In the light curing molding ink set according to any one of [3] to [6], the resin composition for a modeling material further contains an oligomer.

[8] In the light curing molding ink set according to [7], the content of the oligomer is 10 to 45 parts by weight, based on 100 parts by weight of the whole resin composition for a modeling material.

[9] In the light curing molding ink set according to any one of [1] to [8], the surface tension St is 24.0 to 33.0 mN/m.

[10] In the light curing molding ink set according to any one of [1] to [9], the resin composition for a supporting material contains a water-soluble monofunctional ethylenic unsaturated monomer (E), polyalkylene glycol comprising an oxyethylene group and/or an oxypropylene group (F), a photopolymerization initiator (C), and a surface adjusting agent (D).

[11] In the light curing molding ink set according to [10], the content of the (E) component is 20 to 50 parts by weight, based on 100 parts by weight of the whole resin composition for a supporting material.

[12] In the light curing molding ink set according to [10] or [11], the content of the (F) component is 20 to 49 parts by weight, based on 100 parts by weight of the whole resin composition for a supporting material.

[13] In the light curing molding ink set according to any one of [10] to [12], the content of the (E) component is 20 to 50 parts by weight, based on 100 parts by weight of the whole resin composition for a supporting material, and the content of the (F) component is 20 to 49 parts by weight, based on 100 parts by weight of the whole resin composition for a supporting material.

[14] In the light curing molding ink set according to any one of [10] to [13], a number average molecular weight Mn of the (F) component is 100 to 5,000.

[15] The method for manufacturing a light cured article of the present embodiment is a method for manufacturing a light cured article using the light curing molding ink set as defined in any one of [1] to [14] by a manufacturing method for light curing molding using an ink-jet scheme, comprising a step (I) of discharging a resin composition for a modeling material and a resin composition for a supporting material from an ink-jet head, so that a resin composition layer in which a layer composed of the resin composition for a modeling material and a layer composed of the resin composition for a supporting material are arranged contiguously, a step (II) of photocuring the resin composition for a modeling material and the resin composition for a supporting material constituting the resin composition layer, respectively, thereby, obtaining a modeling material and a supporting material, and a step (III) of removing the supporting material, thereby, obtaining a light cured article.

1. Resin Composition for Modeling Material

It is preferable that the resin composition for a modeling material contains a water-insoluble monofunctional ethylenic unsaturated monomer (A), a di- or more-functional polyfunctional ethylenic unsaturated monomer (B), a photopolymerization initiator (C), and a surface adjusting agent (D).

<Water-Insolubles Monofunctional Ethylenic Unsaturated Monomer (A)>

The water-insoluble monofunctional ethylenic unsaturated monomer (A) is a water-insoluble polymerizable monomer having one ethylenic double bond in a molecule, which has property that it cures by energy rays. Examples of the (A) component include, for example, linear or branched alkyl (meth)acrylates having 4 to 30 carbon atoms [e.g. methyl (meth)acrylate, ethyl (meth)acrylate, isobutyl (meth)acrylate, lauryl (meth)acrylate, stearyl (meth)acrylate, isostearyl (meth)acrylate, t-butyl (meth)acrylate etc.], alicycle-containing (meth)acrylates having 6 to 20 carbon atoms [e.g. cyclohexyl (meth)acrylate, 4-t-cyclohexyl (meth)acrylate, isobornyl (meth)acrylate, phenoxyethyl (meth)acrylate, dicyclopentanyl (meth)acrylate etc.], heterocycle-containing (meth)acrylates having 5 to 20 carbon atoms [e.g. tetrahydrofurfuryl (meth)acrylate, 4-(meth)acryloyloxymethyl-2-methyl-2-ethyl-1,3-dioxolane, 4-(meth)acryloyloxymethyl-2-cyclohexyl-1,3-dioxolane, adamantyl (meth)acrylate, cyclic trimethylolpropaneformal (meth)acrylate etc.] and the like. These may be used alone, or two or more may be used concurrently. Among them, from a view point that curability of the resin composition for a modeling material is improved, the (A) component is preferably isobornyl (meth)acrylate, or cyclic trimethylolpropaneformal (meth)acrylate.

From a view point that curability of the resin composition for a modeling material is improved, the component of the (A) component is preferably 19 parts by weight or more, and more preferably 25 parts by weight or more, based on 100 parts by weight of the whole resin composition for a modeling material. Additionally, the content of the (A) component is preferably 49 parts by weight or less, and more preferably 47 parts by weight or less. In addition, when two or more of the (A) components are contained, the content is a total of the contents of respective (A) components.

<Di- or More-Functional Polyfunctional Ethylenic Unsaturated Monomer (B)>

The di- or more-functional polyfunctional ethylenic unsaturated monomer (B) is a polymerizable monomer having two or more ethylenic double bonds in a molecule, which has property that it cures by energy rays. Examples of the (B) component include, for example, linear or branched alkylene glycol di(meth)acrylates or alkylene glycol tri(meth)acrylates having 10 to 25 carbon atoms [e.g. tripropylene glycol di(meth)acrylate, 1,6-hexanediol di(meth)acrylate, neopentyl glycol di(meth)acrylate, 1,9-nonanediol di(meth)acrylate, 3-methyl-1,5-pentanediol di(meth)acrylate, 2-n-butyl-2-ethyl-1,3-propanediol di(meth)acrylate, pentaerythritol tri(meth)acrylate etc.], alicycle-containing di(meth)acrylates having 10 to 30 carbon atoms [e.g. dimethyloltricydodecane di(meth)acrylate, tricyclodecanedimethanol di(meth)acrylate etc.] and the like. These may be used alone, or two or more may be used concurrently. Among them, from a view point that curability of the resin composition for a modeling material is improved, as the (B) component, at least one selected from the group consisting of tripropylene glycol di(meth)acrylate, 1,6-hexanediol di(meth)acrylate, and tricyclodecanedimethanol di(meth)acrylate is preferable.

From a view point that curability of the resin composition for a modeling material is improved, the content of the (B) component is preferably 15 parts by weight or more, and more preferably 20 parts by weight or more, based on 100 parts by weight of the whole resin composition for a modeling material. Additionally, the content of the (B) component is preferably 60 parts by weight or less, and more preferably 50 parts by weight or less. In addition, two or more of the (B) components are contained, the content is a total of the contents of respective (B) components.

<Photopolymerization Initiator (C)>

The photopolymerization initiator (C) is not particularly limited, as far as it is a compound which promotes a radical reaction when light of a wavelength in an ultraviolet ray, near ultraviolet ray or visible light region is irradiated. Examples of the (C) component include, for example, benzoin compounds having 14 to 18 carbon atoms [e.g. benzoin, benzoin methyl ether, benzoin ethyl ether, benzoin propyl ether, benzoin isobutyl ether etc.], acetophenone compounds having 8 to 18 carbon atoms [e.g. acetophenone, 2,2-diethoxy-2-phenylacetophenone, 2,2-diethoxy-2-phenylacetophenone, 1,1-dichloroacetophenone, 2-hydroxy-2-methyl-phenylpropane-1-one, diethoxyacetophenone, 1-hydroxycyclohexyl phenyl ketone, 2-methyl-1-[4-(methylthio)phenyl]-2-morpholinopropane-1-one etc.], anthraquinone compounds having 14 to 19 carbon atoms [e.g. 2-ethylanthraquinone, 2-t-butylanthraquinone, 2-chloroanthraquinone, 2-amylanthraquinone etc.], thioxanthone compounds having 13 to 17 carbon atoms [e.g. 2,4-diethylthioxanthone, 2-isopropylthioxanthone, 2-chlorothioxanthone etc.], ketal compounds having 16 to 17 carbon atoms [e.g. acetophenonedimethylketal, benzyldimethylketal etc.], benzophenone compounds having 13 to 21 carbon atoms [e.g. benzophenone, 4-benzoyl-4'-methyldiphenyl sulfide, 4,4'-bismethylaminobenzophenone etc.], acylphosphine oxide compounds having 22 to 28 carbon atoms [e.g. 2,4,6-trimethylbenzoyl-diphenyl-phosphine oxide, bis-(2,6-dimethoxybenzoyl)-2,4,4-trimethylpentylphosphine oxide, bis(2,4,6-trimethylbenzoyl)-phenylphosphine oxide], a mixture of these compounds and the like. These may be used alone, or two or more may be used concurrently. Among them, from a view point of light resistance that a modeling material which is obtained by photocuring the resin composition for a modeling material is yellowed with difficulty, the (C) component is preferably 2,4,6-trimethylbenzoyl-diphenyl-phosphine oxide. Additionally, examples of an available acylphosphine oxide compound include, for example, DAROCURE TPO manufactured by BASF company and the like.

From a view point of photopolymerizability, the content of the (C) component is preferably 3 parts by weight or more, and more preferably 5 parts by weight or more, based on 100 parts by weight of the whole resin composition for a modeling material. Additionally, the content of the (C) component is preferably 15 parts by weight or less, and more preferably 13 parts by weight or less. In addition, when two or more of the (C) components are contained, the content is a total of the contents of respective (C) components.

<Surface Adjusting Agent (D)>

The surface adjusting agent (D) is a component which adjusts the surface tension of the resin composition at an appropriate range. Examples of the (D) component include, for example, a silicone-based compound and the like. Examples of the silicone-based compound include, for example, a silicone-based compound having a polydimethylsiloxane structure, and the like. Specifically, examples thereof include polyether-modified polydimethylsiloxane, polyester-modified polydimethylsiloxane, polyaralkyl-modified polydimethylsiloxane and the like. As these, BYK-300, BYK-302, BYK-306, BYK-307, BYK-310, BYK-315, BYK-320, BYK-322, BYK-323, BYK-325, BYK-330, BYK-331, BYK-333, BYK-337, BYK-344, BYK-370, BYK-375, BYK-377, BYK-UV3500, BYK-UV3510, BYK-UV3570 (forgoing are manufactured by BYK-Chemie company), TEGO-Rad2100, TEGO-Rad2200N, TEGO-Rad2250, TEGO-Rad2300, TEGO-Rad2500, TEGO-Rad2600, TEGO-Rad2700 (foregoing are manufactured by Degussa company), Granol 100, Granol 115, Granol 400, Granol 410, Granol 435, Granol 440, Granol 450, B-1484, Polyflow ATF-2, KL-600, UCR-L72, UCR-L93 (manufactured by KYOEISHA CHEMICAL Co., LTD.) and the like as expressed by trade name may be used. These may be used alone, or two or more may be used concurrently.

From a view point that the surface tension of the resin composition is adjusted at an appropriate range, the content of the (D) component is preferably 0.005 part by weight or more, and more preferably 0.01 part by weight or more, based on 100 parts by weight of the whole resin composition for a modeling material. Additionally, the content of the (D) component is preferably 3.0 parts by weight or less, and more preferably 1.5 parts by weight or less. In addition, when two or more of the (D) components are contained, the content is a total of the contents of respective (D) components.

The resin composition for a modeling material can contain other additives as necessary in such a range that the effect of the present invention is not impaired. Examples of other additives include, for example, an oligomer, an antioxidant, a coloring agent, a Pigment dispersant, a preservation stabilizer, an ultraviolet absorbing agent, a light stabilizer, a polymerization inhibitor, a chain transfer agent, a filler and the like.

Examples of the oligomer include, for example, a urethane (meth)acrylate oligomer, an epoxy (meth)acrylate oligomer, a polyester (meth)acrylate oligomer, a polyether (meth)acrylate oligomer and the like. These may be used alone, or two or more may be used concurrently. Among them, from a view point that curability of the resin composition for a modeling material is improved, the oligomer is preferably a urethane (meth)acrylate oligomer.

From a view point that curability of the resin composition for a modeling material is improved, the content of the oligomer is preferably 10 parts by weight or more, and more preferably 15 parts by weight or more, based on 100 parts by weight of the whole resin composition for a modeling material. Additionally, the content of the oligomer is preferably 45 parts by weight or less, and more preferably 30 parts by weight or less. In addition, when two or more of the oligomers are contained, the content is a total of the contents of respective oligomers.

In addition, in the present description, the "oligomer" has a weight average molecular weight of 800 to 10,000. A weight average molecular weight means a weight average molecular weight in terms of polystyrene, which is measured by GPC (Gel Permeation Chromatography).

As the coloring agent, for example, the previously known coloring agents such as a diarylide-based coloring agent, a condensed azo-based coloring agent, a quinacridone-based coloring agent, a vat-based coloring agent, an isoindolinone-based coloring agent, a phthalocyanine-based coloring agent, an aniline-based coloring agent, titanium oxide, nickel titanium, yellow iron oxide, red iron oxide, ultramarine, cobalt blue, chromium oxide, iron black, chrome yellow, chrome orange, molybdenum red, a cadmium-based coloring agent, carbon black and the like can be used. These may be used alone, or two or more may be used concurrently. Among them, the coloring agent is preferably, for example, carbon black, Nickel Azo which is a condensed azo-based coloring agent, Quinacridone which is a quinacridone-based coloring agent, copper phthalocyanine which is a phthalocyanine-based coloring agent, titanium oxide or the like. The content of the coloring agent is preferably 0.01 part by weight or more, and more preferably 0.1 part by weight or more, based on 100 parts by weight of the whole resin composition for a modeling material. Additionally, the content of the coloring agent is preferably 5.0 parts by weight or less, and more preferably 3.0 parts by weight or less.

When a pigment is used as the coloring agent, the pigment dispersant may be contained in order to improve dispersibility of the pigment. Examples of the pigment dispersant include, for example, an ionic or nonionic surfactant, an anionic, cationic or nonionic polymer compound and the like. These may be used alone, or two more may be used concurrently. Among them, from respect of dispersion stability, the pigment dispersant is preferably a polymer compound comprising a cationic group or an anionic group. Examples of the pigment dispersant which is available in the market include Solsperse manufactured by Avecia company, DISPERBYK manufactured by BYK-Chemie company, EFKA manufactured by EFKA ADDITIVES B.V., and the like. The content of the pigment dispersant is preferably 0.05 part by weight or more, based on 100 parts by weight of the whole resin composition for a modeling material. Additionally, the content of the pigment dispersant is preferably 5 parts by weight or less.

The preservation stabilizer may be contained in order to enhance preservation stability of the resin composition. Examples of the preservation stabilizer include, for example, a hindered amine-based compound (HALS), a phenol-based antioxidant, a phosphorus-based antioxidant and the like. Examples of the preservation stabilizer include specifically hydroquinone, methoquinone, benzoquinone, p-methoxyphenol, hydroquinone monomethyl ether, hydroquinone monobutyl ether, TEMPO, 4-hydroxy-TEMPO, TEMPOL, Cupherron AI, IRGASTAB UV-10, IRGASTAB FIRST-CURE ST-1 (manufactured by ALBEMARLE company), t-butylcatechol, pyrogallol, TINUVIN 111 FDL, TINUVIN 144, TINUVIN 292, TINUVIN XP40, TINUVIN XP60, TINUVIN 400 manufactured by BASF company, and the like. These may be used alone, or two or more may be used concurrently.

The resin composition for a modeling material can be manufactured, for example, by uniformly mixing the (A) to (D) components, and as necessary, other additives using a mixing and stirring device or the like, without particular limitation.

The thus manufactured resin composition for a modeling material has preferably the viscosity at 25° C. of 70 mPa·s or less, from a view point that dischargeability from an ink-jet head is improved. In addition, measurement of the viscosity of the resin composition for a modeling material is performed using a R100-type viscometer in accordance with JIS Z 8803.

Additionally, the resin composition for a modeling material has preferably the surface tension Mt of 26.0 to 33.0 mN/m, from a view point that dischargeability from an ink-jet head is improved. In addition, in the present description, the surface tension refers to a value of the surface tension after 20 seconds from measurement initiation at 25° C. Measurement of the surface tension is performed, for example, using Full Automatic Equilibrium Electro Surface Tension Meter ESB-V (manufactured by Kyowa Interface Science Co., Ltd.).

2. Resin Composition for Supporting Material

It is preferable that the resin composition for a supporting material contains a water-soluble monofunctional ethylenic unsaturated monomer (E), polyalkylene glycol comprising an oxyethylene group and/or an oxypropylene group (F), a photopolymerization initiator (C), and a surface adjusting agent (D).

<Water-Soluble Monofunctional Ethylenic Unsaturated Monomer (E)>

The water-soluble monofunctional ethylenic unsaturated monomer (E) is a water-soluble polymerizable monomer having one ethylenic double bond in a molecule, which has property that it cures by energy rays. Examples of the (E) component include, for example, hydroxy group-containing (meth)acrylates having 5 to 15 carbon atoms [e.g. hydroxyethyl (meth)acrylate, hydroxypropyl (meth)acrylate, 4-hydroxybutyl (meth)acrylate etc.], hydroxy group-containing (meth)acrylates having Mn of 200 to 1,000 [polyethylene glycol mono(meth)acrylate, monoalkoxy (having 1 to 4 carbon atoms)polyethylene glycol mono(meth)acrylate, polypropylene glycol mono(meth)acrylate, monoalkoxy (having 1 to 4 carbon atoms)polypropylene glycol mono(meth)acrylate, mono(meth)acrylate of PEG-PPG block polymer etc.], (meth)acrylamide derivatives having 3 to 15 carbon atoms [(meth)acrylamide, N-methyl(meth)acrylamide, N-ethyl(meth)acrylamide, N-propyl(meth)acrylamide, N-butyl(meth)acrylamide, N,N'-dimethyl(meth)acrylamide, N, N'-diethyl(meth)acrylamide, N-hydroxyethyl(meth)acrylamide, N-hydroxypropyl(meth)acrylamide, N-hydroxybutyl(meth)acrylamide etc.], (meth)acryloylmorpholine and the like. These may be used alone, or two or more may be used concurrently. Among them, from a view point of improvement in curability of the resin composition for a supporting material and a view point of skin low irritation, the (E) component is preferably N-hydroxyethyl(meth)acrylamide, or (meth)acryloylmorpholine.

From a view point that curability of the resin composition for a supporting material is improved, and a supporting material which is obtained by photocuring the resin composition for a supporting material is rapidly dissolved in water, the content of the (E) component is preferably 20 parts by weight or more, and more preferably 25 parts by weight or more, based on 100 parts by weight of the whole resin composition for a supporting material. Additionally, the content of the (E) component is preferably 50 parts by weight or less, and more preferably 45 parts by weight or less. In addition, when two or more of the (E) components are contained, the content is a total of the contents of respective (E) components.

<Polyalkylene Glycol Comprising Oxyethylene Group and/or Oxypropylene Group (F)>

The polyalkylene glycol comprising an oxyethylene group and/or an oxypropylene group (F) is such that at least ethylene oxide and/or propylene oxide are (is) added to an active hydrogen compound. Examples of the (F) component include, for example, polyethylene glycol, polypropylene glycol and the like. These may be used alone, or two or more may be used concurrently. Examples of the active hydrogen compound include monohydric to tetrahydric alcohols, amine compounds and the like. Among them, the active hydrogen compound is preferably a dihydric alcohol or water.

From a view point that solubility in water of a supporting material which is obtained by photocuring the resin composition for a supporting material is enhanced, the content of the (F) component is preferably 20 parts by weight or more, and more preferably 25 parts by weight or more, based on 100 parts by weight of the whole resin composition for a supporting material. Additionally, the content of the (F) component is preferably 49 parts by weight or less, and more preferably 45 parts by weight or less. In addition, when two or more of the (F) components are contained, the content is a total of the contents of respective (F) components.

A number average molecular weight Mn of the (F) component is preferably 100 to 5,000. When Mn of the (F) component is in the range, the resin composition is compatible with the (F) component before photocuring, and is not compatible with the (F) component after photocuring. As a result, self-standing of a supporting material which is obtained by photocuring the resin composition for a supporting material can be enhanced, and solubility of the supporting material in water can be enhanced. Mn of the (F) component is more preferably 200 to 3,000, and further preferably 400 to 2,000.

<Photopolymerization Initiator (C)>

<Surface Adjusting Agent (D)>

As the photopolymerization initiator (C) and the surface adjusting agent (D), the same components as those of the resin composition for a modeling material can be used at the same contents.

The resin composition for a supporting material can contain other additives, as necessary, in such a range that the effect of the present invention is not impaired. Examples of other additives include, for example, a water-soluble organic solvent, an antioxidant, a coloring agent, a pigment dispersant, a preservation stabilizer, an ultraviolet absorbing agent, a light stabilizer, a polymerization inhibitor, a chain transfer agent, a filler and the like.

Examples of the water-soluble organic solvent include, for example, ethylene glycol monoacetate, propylene glycol monoacetate, diethylene glycol monoacetate, dipropylene glycol monoacetate, triethylene glycol monoacetate, tripropylene glycol monoacetate, tetraethylene glycol monoacetate, tetrapropylene glycol monoacetate, ethylene glycol monomethyl ether, propylene glycol monomethyl ether, diethylene glycol monomethyl ether, dipropylene glycol monomethyl ether, triethylene glycol monomethyl ether, tripropylene glycol monomethyl ether, tetraethylene glycol monomethyl ether, tetrapropylene glycol monomethyl ether, ethylene glycol monoethyl ether, propylene glycol monoethyl ether, diethylene glycol monoethyl ether, dipropylene glycol monoethyl ether, triethylene glycol monoethyl ether, tripropylene glycol monoethyl ether, tetraethylene glycol monoethyl ether, tetrapropylene glycol monoethyl ether, ethylene glycol monopropyl ether, propylene glycol monopropyl ether, diethylene glycol monopropyl ether, dipropylene glycol monopropyl ether, triethylene glycol monopropyl ether, tripropylene glycol monopropyl ether, tetraethylene glycol monopropyl ether, tetrapropylene glycol monopropyl ether, ethylene glycol monobutyl ether, propylene glycol monobutyl ether, diethylene glycol monobutyl ether, dipropylene glycol monobutyl ether, triethylene glycol monobutyl ether, tripropylene glycol monobutyl ether, tetraethylene glycol monobutyl ether, tetrapropylene glycol monobutyl ether, ethylene glycol diacetate, propylene glycol diacetate, diethylene glycol diacetate, dipropylene glycol diacetate, triethylene glycol diacetate, tripropylene glycol diacetate, tetraethylene glycol diacetate, tetrapropylene glycol diacetate, ethylene glycol dimethyl ether, propylene glycol dimethyl ether, diethylene glycol dimethyl ether, dipropylene glycol dimethyl ether, triethylene glycol dimethyl ether, tripropylene glycol dimethyl ether, tetraethylene glycol dimethyl ether, tetrapropylene glycol dimethyl ether, ethylene glycol diethyl ether, propylene glycol diethyl ether, diethylene glycol diethyl ether, dipropylene glycol diethyl ether, triethylene glycol diethyl ether, tripropylene glycol diethyl ether, tetraethylene glycol diethyl ether, tetrapropylene glycol diethyl ether, ethylene glycol dipropyl ether, propylene glycol dipropyl ether, diethylene glycol dipropyl ether, dipropylene glycol dipropyl ether, triethylene glycol dipropyl ether, tripropylene glycol dipropyl ether, tetraethylene glycol dipropyl ether, tetrapropylene glycol dipropyl ether, ethylene glycol dibutyl ether, propylene glycol dibutyl ether, diethylene glycol dibutyl ether, dipropylene glycol dibutyl ether, triethylene glycol dibutyl ether, tripropylene glycol dibutyl ether, tetraethylene glycol dibutyl ether, tetrapropylene glycol dibutyl ether, ethylene glycol monomethyl ether acetate, propylene glycol monomethyl ether acetate, diethylene glycol monomethyl ether acetate, dipropylene glycol monomethyl ether acetate, triethylene glycol monomethyl ether acetate, tripropylene glycol monomethyl ether acetate, tetraethylene glycol monomethyl ether acetate, tetrapropylene glycol monomethyl ether acetate, ethylene glycol monoethyl ether acetate, propylene glycol monoethyl ether acetate, diethylene glycol monoethyl ether acetate, dipropylene glycol monoethyl ether acetate, triethylene glycol monoethyl ether acetate, tripropylene glycol monoethyl ether acetate, tetraethylene glycol monoethyl ether acetate, tetrapropylene glycol monoethyl ether acetate, ethylene glycol monopropyl ether acetate, propylene glycol monopropyl ether acetate, diethylene glycol monopropyl ether acetate, dipropylene glycol monopropyl ether acetate, triethylene glycol monopropyl ether acetate, tripropylene glycol monopropyl ether acetate, tetraethylene glycol monopropyl ether acetate, tetrapropylene glycol monopropyl ether acetate, ethylene glycol monobutyl ether acetate, propylene glycol monobutyl ether acetate, diethylene glycol monobutyl ether acetate, dipropylene glycol monobutyl ether acetate, triethylene glycol monobutyl ether acetate, tripropylene glycol monobutyl ether acetate, tetraethylene glycol monobutyl ether acetate, tetrapropylene glycol monobutyl ether acetate and the like. These may be used alone, or two or more may be used concurrently. From a view point that solubility of the supporting material in water is improved, and the resin composition for a supporting material is adjusted at the low viscosity, among them, the water-soluble organic solvent is more preferably triethylene glycol monomethyl ether, or dipropylene glycol monomethyl ether acetate.

From a view point that solubility of the supporting material in water is improved, and the resin composition for a supporting material is adjusted at the low viscosity, the content of the water-soluble organic solvent is preferably 5 parts by weight or more, and more preferably 10 parts by weight or more, based on 100 parts by weight of the whole resin composition for a supporting material. Additionally, the content of the water-soluble organic solvent is preferably 35 parts by weight or less, and more preferably 30 parts by weight or less. In addition, when two or more of the water-soluble organic solvents are contained, the content is a total of the contents of respective water-soluble organic solvents.

As the coloring agent, the pigment dispersant, and the preservation stabilizer, the same components as those of the resin-composition for a modeling material can be used at the same contents.

A method for manufacturing the resin composition for a supporting material is not particularly limited. The resin composition for a supporting material can be manufactured, for example, by uniformly mixing the (C) to (F) components, and as necessary, other additives using a mixing and stirring device or the like.

From a view point that dischargeability from an ink-jet head is improved, the thus manufactured resin composition for a supporting material has preferably the viscosity at 25° C. of 70 mPa·s or less. In addition, measurement of the viscosity of the resin composition for a supporting material is performed using a R100-type viscometer in accordance with JIS Z 8803.

Additionally, from a view point that dischargeability from an ink-jet head is improved, the resin composition for a supporting material has preferably the surface tension St of 24.0 to 33.0 mN/m. In addition, in the present description, the surface tension refers to a value of the surface tension after 20 seconds from measurement initiation at 25° C. Measurement of the surface tension is performed, for example, using Full Automatic Equilibrium Electro Surface Tension Meter ESB-V (manufactured by Kyowa Interface Science Co., Ltd.).

3. Surface Tension

In the light curing molding ink set of the present embodiment, surface tension Mt (mN/m) of the resin composition for a modeling material is greater than surface tension St (mN/m) of the resin composition for a supporting material, and the surface tension Mt and the surface tension St satisfy the following (i) expression.

$$0 < Mt - St < 5 \quad (i)$$

When the surface tension Mt is greater than the surface tension St, and the surface tensions Mt and St satisfy the (i) expression, generation of bleeding at an interface between the layer composed of the resin composition for a modeling material and the layer composed of the resin composition for a supporting material can be suppressed. That is, by movement of the resin composition for a modeling material to a side of the resin composition for a supporting material, or movement of the resin composition for a supporting material to a side of the resin composition for a modeling material, phenomenon that bleeding is generated becomes difficult to be generated. As a result, a light curing molding ink set comprising a combination of such resin composition for a modeling material and resin composition for a supporting material can be used to obtain a light cured article having the good dimensional accuracy.

In the case where the surface tension Mt is smaller than the surface tension St, that is, a difference between the surface tensions Mt and St (Mt–St) is 0 or less, by movement of the resin composition for a modeling material to a side of the resin composition for a supporting material, at an interface between the layer composed of the resin composition for a modeling material and the layer composed of the resin composition for a supporting material, bleeding is generated. On the other hand, in the case where the difference (Mt–St) is 5 or more, by movement of the resin composition for a supporting material to a side of the resin composition for a modeling material, at an interface between the layer composed of the resin composition for a modeling material and the layer composed of the resin composition for a supporting material, bleeding is generated.

4. Photofabrication Model and Manufacturing Method Thereof

The light cured article is manufactured using the light curing molding ink set of the present embodiment, by a manufacturing method for light curing molding using an ink-jet scheme. Specifically, the light cured article is manufactured by passing through a step (I) of discharging a resin composition for a modeling material and a resin composition for a supporting material from an ink-jet head so that a resin composition layer in which a layer composed of the resin composition for a modeling material and a layer composed of the resin composition for a supporting material are arranged contiguously is formed, a step (II) of photocuring the resin composition for a modeling material and the resin composition for a supporting material constituting the resin composition layer, respectively, thereby, obtaining a modeling material and a supporting material, and a step (III) of removing the supporting material to obtain a light cured article. The steps (I) to (III) are not particularly limited, but are performed, for example, by the following method.

<Step (I)>

FIG. 1 is a view schematically showing a step (I) in the method for manufacturing a light cured article of the present embodiment. As shown in FIG. 1, a three-dimensional shaping apparatus 1 comprises an ink-jet head module 2 and a shaping table 3. The ink-jet head module 2 has a light curing molding ink unit 25, a roller 23, and a light source 24. The light curing molding ink unit 25 has an ink-jet head 21 for a modeling material, which is filled with a resin composition 4a for a modeling material, and an ink-jet head 22 for a supporting material, which is filled with a resin composition 5a for a supporting material. In addition, the light curing molding ink set 20 of the present embodiment is constructed of a combination of the resin composition 4a for a modeling material and the resin composition 5a for a supporting material.

First, the ink-jet head module 2 is made to perform scanning in an X direction and a Y direction, and at the same time, discharge the resin composition 4a for a modeling material from the ink-jet head 21 for a modeling material, and discharge the resin composition 5a for a supporting material from the ink-jet head 22 for a supporting material, relatively to the shaping table 3 in FIG. 1. Thereby, a resin composition layer in which interfaces between a layer composed of the resin composition 4a for a modeling material and a layer composed of the resin composition 5a for a supporting material are arranged contiguously so as to come into contact with each other is formed on the shaping table 3. And, in order to smooth an upper surface of the resin composition layer, the extra resin composition 4a for a modeling material and resin composition 5a for a supporting material are removed using the roller 23.

<Step (II)>

Figure 2:
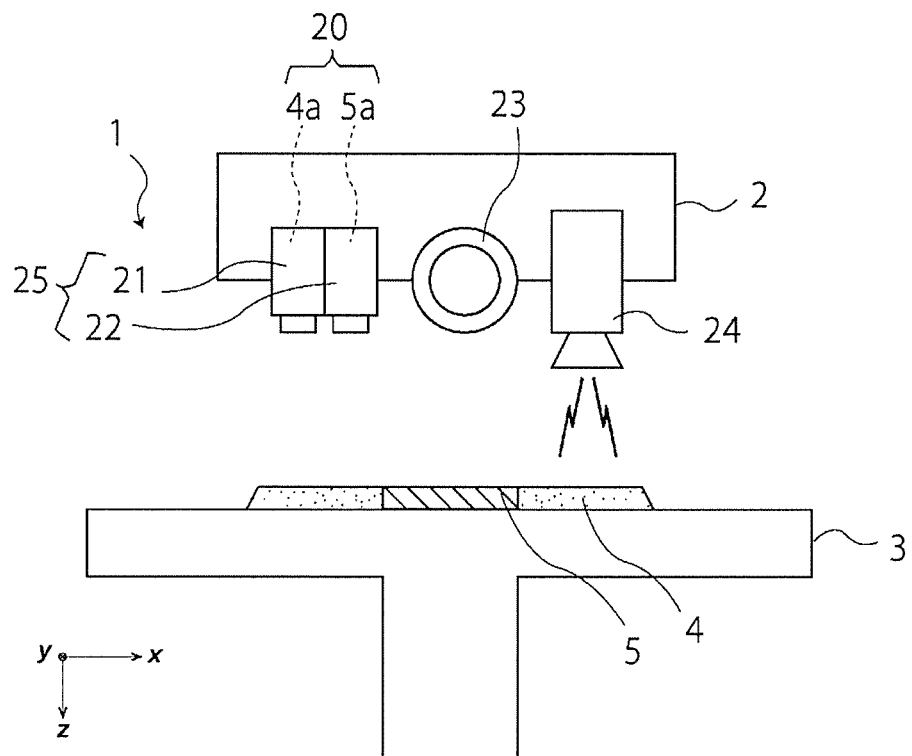
FIG. 2 is a view schematically showing a step (II) in the method for manufacturing a light cured article of the present embodiment.

FIG. 2 is a view schematically showing a step (II) in the method for manufacturing a light cured article of the present embodiment. As shown in FIG. 2, by irradiating light to the resin composition layer which has been formed by a step (I), using the light source 24, a cured layer comprising a modeling material 4 and a supporting material 5 is formed.

Figure 3:
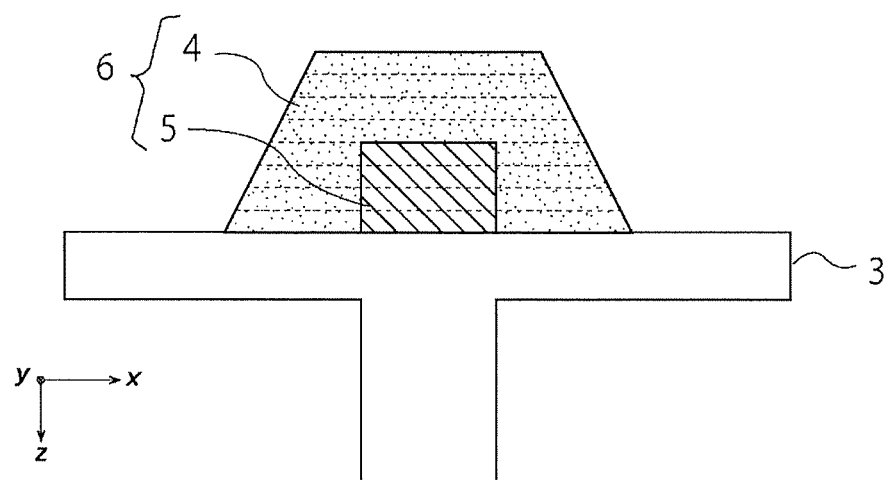
FIG. 3 is a view schematically showing a cured product 6 composed of a modeling material 4 and a supporting material 5, which was obtained by repeatedly performing steps (I) and (II) in the method for manufacturing a light cured article of the present embodiment.

Then, the shaping table 3 is lowered in a Z direction in FIG. 1 by a thickness of the cured layer. Thereafter, by the same methods as those of the steps (I) and (II), on the cured layer, a cured layer comprising a modeling material 4 and a supporting material 5 is further formed. By performing these steps repeatedly, a cured product 6 composed of the modeling material 4 and the supporting material 5 is made. FIG. 3 is a view schematically showing a cured product 6 composed of a modeling material 4 and a supporting material 5, which has been obtained by repeatedly performing steps (I) and (II) in the method for manufacturing a light cured article of the present embodiment.

Examples of light which cures the resin composition include, for example, far infrared rays, infrared rays, visible rays, near ultraviolet rays, ultraviolet rays and the like. Among them, from a view point of easiness and the efficiency of curing work, near ultraviolet rays or ultraviolet rays are preferable.

Examples of the light source 24 include a mercury lamp, a metal halide lamp, an ultraviolet LED, an ultraviolet laser and the like. Among them, from a view point of miniaturization of facilities and electric power saving, the light source 24 is preferably an ultraviolet LED. In addition, when the ultraviolet LED is used as the light source 24, the integrated light quantity of ultraviolet rays is preferably around 500 mJ/cm$^2$.

<Step (III)>

Figure 4:
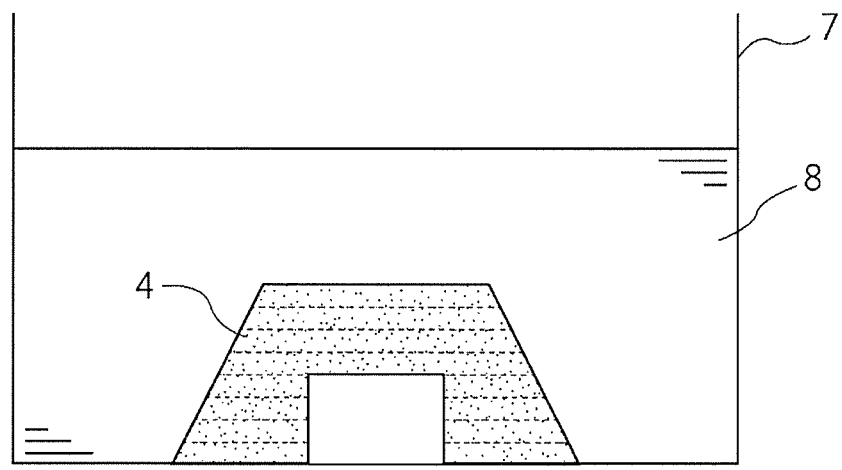
FIG. 4 is a view schematically showing a step (III) in the method for manufacturing a light cured article of the present embodiment.

FIG. 4 is a view schematically showing a step (III) in the method for manufacturing a light cured article of the present embodiment. As shown in FIG. 4, the cured product 6 composed of the modeling material 4 and the supporting material 5, which has been made in a step (III), is immersed in a solvent 8 contained in a container 7. Thereby, the supporting material 5 can be removed by dissolving it in the solvent 8.

Examples of the solvent 8 which dissolves the supporting material 5 include, for example, ion-exchanged water, distilled water, tap water, well water and the like. Among them, from a view point of relatively few impurities and availability at a low price, the solvent 8 is preferably ion-exchanged water.

By the forgoing steps, a light cured article having the good dimensional accuracy can be obtained using the light curing molding ink set of the present embodiment.

Examples which disclose the present embodiment more specifically will be shown below. In addition, the present invention is not limited to only these Examples.

EXAMPLES

[Assessment of Relevancy Between Dimensional Accuracy and Bleeding]

<Method of Assessing Dimensional Accuracy>

Figure 6:
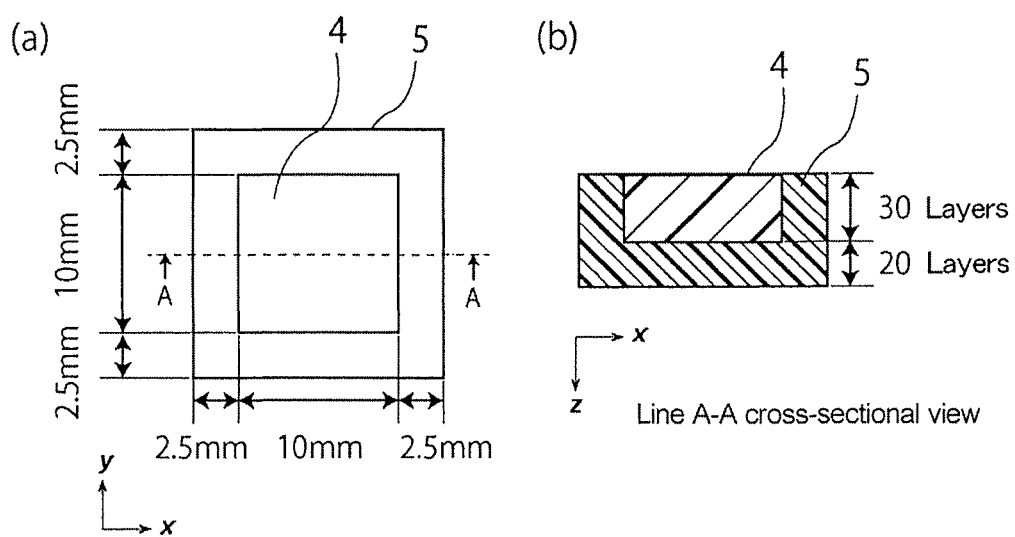
FIG. 6 (a) is a top view of a cured product which is obtained by using each resin composition for a modeling material and each resin composition for a supporting material shown in Table 1.

Using each resin composition for a modeling material and each resin composition for a supporting material of test Nos. A1 to A4 shown in Table 1, a cured product was made. A shape and a target dimension of the cured product are shown in FIGS. 6 (a) and (b). In addition, a step of discharging each resin composition for a modeling material and each resin composition for a supporting material from an ink-jet head was performed so that the resolution became 600×600 dpi, and a thickness of one resin composition layer became 48 μm. Additionally, a step of photocuring each resin composition for a modeling material and each resin composition for a supporting material, respectively, was performed using a LED light source of a wavelength 385 nm, which had been installed on a rear side of an ink-jet head in a scanning direction, under the conditions of the illuminance of 580 mW/cm$^2$, and the integrated light quantity per one resin composition layer of 600 mJ/cm$^2$. Then, by immersing the cured product in ion-exchanged water, the supporting material was removed to obtain a light cured article. Thereafter, the resulting light cured article was allowed to stand in a desiccator for 24 hours, and was sufficiently dried. By the above-mentioned step, each five of light cured articles of test Nos. A1 to A4 were manufactured. Concerning the light cured articles after drying, dimensions in an x direction and a y direction in FIG. 6 (a) were measured using a slide caliper, and a change rate from the target dimension was calculated. For the dimensional accuracy, an average of a dimensional change rate in respective light cured articles of test Nos. A1 to A4 was obtained, and assessment was performed using the average based on the following criteria. The assessment results are shown in Table 1.

◯: An average dimensional change rate is less than ±1.0%.

x: An average dimensional change rate is ±1.0% or more.

<Method of Assessing Bleeding>

First, each 0.02 mL of each resin composition for a modeling material and each resin composition for a supporting material shown in Table 1 were added dropwise on a film made of polyethylene terephthalate (A4300, manufactured by TOYOBO CO., LTD., 100 mm×150 mm×thickness 188 μm) using a micropipette. Thereupon, in the resin composition for a modeling material and the resin composition for a supporting material, a distance between central parts of respective liquid droplets was 10 mm, and respective liquid droplets were independent. Thereafter, respective liquid droplets were gradually wettedly spread, and respective liquid droplets were unified after about 10 seconds. Thereupon, the state of an interface of respective liquid droplets was observed visually from an upper side, and bleeding was assessed based on the following criteria. The assessment results are shown in Table 1.

◯: An interface between a layer composed of a resin composition for a modeling material and a layer composed of a resin composition for a supporting material became linear when viewed from the top, and bleeding was not generated.

x [M→S]: By movement of a resin composition for a modeling material to a side of a resin composition for a supporting material, at an interface between a layer composed of a resin composition for a modeling material and a layer composed of a resin composition for a supporting material, bleeding was generated.

x [S→M]: By movement of a resin composition for a supporting material to a side of a resin composition for a modeling material, at an interface between a layer composed of a resin composition for a modeling material and a layer composed of a resin composition for a supporting material, bleeding was generated.

TABLE 1

| Test No | Resin composition for modeling material | Resin composition for supporting material | Dimensional accuracy x direction | y direction | Bleeding assessment |
|---|---|---|---|---|---|
| A1 | MTD-23 | STD-9 | x | x | x [M→S] |
| A2 | | STD-11 | ◯ | ◯ | ◯ |

TABLE 1-continued

| Test No | Resin composition for modeling material | Resin composition for supporting material | Dimensional accuracy x direction | y direction | Bleeding assessment |
|---|---|---|---|---|---|
| A3 | MTD-25 | STD-9 | x | x | x [M→S] |
| A4 | | STD-11 | ◯ | ◯ | ◯ |

As seen from the results of Table 1, in the light cured articles of test Nos. A2 and A4, which had the good dimensional accuracy, an interface between the layer composed of the resin composition for a modeling material and the layer composed of the resin composition for a supporting material became linear, and bleeding was not generated. On the other hand, in the light cured articles of test Nos. A1 and A3, the dimensional accuracy of which had reduced, by movement of the resin composition for a modeling material to a side of the resin composition for a supporting material, at an interface between the layer composed of the resin composition for a modeling material and the layer composed of the resin composition for a supporting material, bleeding was generated. In this way, bleeding which is generated at an interface between the layer composed of the resin composition for a modeling material and the layer composed of the resin composition for a supporting material is one of the causes for reduction in the dimensional accuracy of the light cured article. Then, bleeding which is generated at an interface between the layer composed of the resin composition for a modeling material and the layer composed of the resin composition for a supporting material was assessed below.

[Assessment of Bleeding]

<Preparation of Resin Composition>

(Preparation of Resin Composition for Modeling Material)

According to formulation shown in Table 2, (A) to (D) components, and other additives were uniformly mixed using a mixing and stirring device, and resin compositions for a modeling material of M1 to M15 were manufactured.

TABLE 2

| Resin composition for modeling material | | | | M1 | M2 | M3 | M4 | M5 | M6 | M7 | M8 |
|---|---|---|---|---|---|---|---|---|---|---|---|
| Formulation (part by weight) | (A) | Water-insoluble monofunctional ethylenic unsaturated monomer | IBOA | 40.5 | 40.4 | 40.2 | 40.0 | 39.5 | — | — | — |
| | | | TMPFA | — | — | — | — | — | 45.5 | 45.5 | 45.5 |
| | (B) | Di- or more-functional polyfunctional ethyleneic unsaturated monomer | HDDA | 20 | 20 | 20 | 20 | 20 | — | — | — |
| | | | TPGDA | — | — | — | — | — | 20 | 20 | 20 |
| | | | TCDDA | 30 | 30 | 30 | 30 | 30 | — | — | — |
| | (C) | Photopolymerization initiator | DAROCURE TPO | 8 | 8 | 8 | 8 | 8 | 8 | 8 | 8 |
| | (D) | Surface adjusting agent | BYK-UV3500 | — | — | — | — | — | — | 0.01 | 0.03 |
| | | | BYK-307 | — | 0.1 | 0.3 | 0.5 | 1.0 | — | — | — |
| | Other additives | Oligomer | CN991 | — | — | — | — | — | 25 | 25 | 25 |
| | | Coloring agent | MA-8 | — | — | — | — | — | — | — | — |
| | | | Yellow G01 | — | — | — | — | — | — | — | — |
| | | | RT355D | — | — | — | — | — | — | — | — |
| | | | BT-617-D | — | — | — | — | — | — | — | — |
| | | | CR-60 | 1.00 | 1.00 | 1.00 | 1.00 | 1.00 | 1.00 | 1.00 | 1.00 |
| | | Pigment dispersant | Sol.32000 | 0.50 | 0.50 | 0.50 | 0.50 | 0.50 | 0.50 | 0.50 | 0.50 |
| | | Surface tension (mN/m) | | 33.2 | 31.5 | 29.6 | 26.3 | 23.7 | 34.1 | 31.8 | 30.1 |
| | Discharge stability | Nozzle slip-out | | ◯ | ◯ | ◯ | ◯ | X | ◯ | ◯ | ◯ |
| | | Ligament length | | Δ | ◯ | ◯ | ◯ | ◯ | Δ | ◯ | ◯ |

TABLE 2-continued

| Resin composition for modeling material | | | | M9 | M10 | M11 | M12 | M13 | M14 | M15 |
|---|---|---|---|---|---|---|---|---|---|---|
| Formulation (part by weight) | (A) | Water-insoluble monofunctional ethylenic unsaturated monomer | IBOA | — | — | 41.0 | 41.0 | 41.0 | 41.0 | 41.7 |
| | | | TMPFA | 45.5 | 45.4 | — | — | — | — | — |
| | (B) | Di- or more-functional polyfunctional ethyleneic unsaturated monomer | HDDA | — | — | 20 | 20 | 20 | 20 | 20 |
| | | | TPGDA | 20 | 20 | — | — | — | — | — |
| | | | TCDDA | — | — | 30 | 30 | 30 | 30 | 30 |
| | (C) | Photopolymerization initiator | DAROCURE TPO | 8 | 8 | 8 | 8 | 8 | 8 | 8 |
| | (D) | Surface adjusting agent | BYK-UV3500 | 0.05 | 0.10 | — | — | — | — | — |
| | | | BYK-307 | — | — | 0.3 | 0.3 | 0.3 | 0.3 | 0.3 |
| Other additives | Oligomer | | CN991 | 25 | 25 | — | — | — | — | — |
| | Coloring agent | | MA-8 | — | — | 0.50 | — | — | — | — |
| | | | Yellow G01 | — | — | — | 0.50 | — | — | — |
| | | | RT355D | — | — | — | — | 0.50 | — | — |
| | | | BT-617-D | — | — | — | — | — | 0.50 | — |
| | | | CR-60 | 1.00 | 1.00 | — | — | — | — | — |
| | Pigment dispersant | | Sol.32000 | 0.50 | 0.50 | 0.25 | 0.25 | 0.25 | 0.25 | — |
| | Surface tension (mN/m) | | | 26.7 | 25.1 | 29.4 | 29.5 | 29.2 | 29.6 | 29.8 |
| Discharge stability | | | Nozzle slip-out | ◯ | Δ | ◯ | ◯ | ◯ | ◯ | ◯ |
| | | | Ligament length | ◯ | ◯ | ◯ | ◯ | ◯ | ◯ | ◯ |

IBOA: Isobornyl acrylate [SR506D (ethylenic double bond/one molecule: one), manufactured by Arkema S.A.]

TMPFA: Cyclic trimethylolpropaneformal acrylate [SR531 ethylenic double bond/one molecule: one), manufactured by Arkema S.A.]

HDDA: 1,6-Hexanediol diacrylate [SR238 (ethylenic double bond/one molecule: 2), manufactured by Arkema S.A.]

TPGDA: Tripropylene glycol diacrylate [SR306 (ethylenic double bond/one molecule: 2), manufactured by Arkema S.A.]

TCDDA: Tricyclodecanedimethanol diacrylate [SR833 (ethylenic double bond/one molecule: 2), manufactured by Arkema S.A.]

DAROCURE TPO: 2,4,6-Trimethylbenzoyl-diphenyl-phosphine oxide [DAROCURE TPO, manufactured by BASF company]

BYK-UV3500: Silicone-based compound having a polydimethylsiloxane structure [BYK-UV3500, manufactured by BYK-Chemie company]

BYK-307: Silicone-based compound having a polydimethylsiloxane structure [BYK-307, manufactured by BYK-Chemie company]

CN991: Urethane acrylate oligomer [CN991 (ethylenic double bond/one molecule: 2), manufactured by Arkema S.A.]

MA-8: Acidic carbon black pigment [MA-8, manufactured by Mitsubishi Chemical Corporation]

Yellow GO1: Nickel azo pigment [Yellow GO1, manufactured by Levascreen company]

RT355D: Quinacridone pigment [CINQUASIA Magenda RT-355-D, manufactured by Ciba company]

BT-617-D: Copper phthalocyanine pigment [HOSTA-PERM BLUE BT-617-D, manufactured by Clariant company]

CR-60: Titanium oxide [CR-60, manufactured by ISHI-HARA SANGYO KAISHA, LTD.]

Sol. 32000: Comb-type copolymer having a basic functional group [Solsperse 32000, manufactured by Avecia company]

(Preparation of Resin Composition for Supporting Material)

According to formulation shown in Table 3, (C) to (F) components, and a water-soluble organic solvent were uniformly mixed using a mixing and stirring device, and resin compositions for a supporting material of S1 to S10 were manufactured.

TABLE 3

| Resin composition for supporting material | | | | S1 | S2 | S3 | S4 | S5 | S6 | S7 | S8 | S9 | S10 |
|---|---|---|---|---|---|---|---|---|---|---|---|---|---|
| Formulation (part by weight) | (E) | Water-soluble monofunctional ethylenic unsaturated monomer | HEAA | 30.0 | 30.0 | 30.0 | 30.0 | 30.0 | — | — | — | — | — |
| | | | ACMO | — | — | — | — | — | 35.0 | 35.0 | 35.0 | 35.0 | 35.0 |
| | (F) | Polyalkylene glycol comprising oxyethylene group and/or oxypropylene group | PPG-1000 | — | — | — | — | — | 40.0 | 40.0 | 40.0 | 40.0 | 40.0 |
| | | | PEG-400 | 45.0 | 45.0 | 45.0 | 45.0 | 45.0 | — | — | — | — | — |
| | (C) | Photopolymerization initiator | DAROCURE TPO | 5.0 | 5.0 | 5.0 | 5.0 | 5.0 | — | — | — | — | — |
| | | | IRGACURE907 | — | — | — | — | — | 5.0 | 5.0 | 5.0 | 5.0 | 5.0 |
| | | | Chivacure ITX | — | — | — | — | — | 2.0 | 2.0 | 2.0 | 2.0 | 2.0 |
| | (D) | Surface adjusting agent | BYK-307 | — | 0.05 | 0.10 | 0.12 | 0.15 | — | 0.05 | 0.10 | 0.12 | 0.15 |
| Other additives | Water-soluble organic solvent | | MTG | 20.0 | 19.9 | 19.9 | 19.9 | 19.8 | — | — | — | — | — |
| | | | DPMA | — | — | — | — | — | 18.0 | 18.0 | 18.0 | 18.0 | 18.0 |
| | Surface tension (mN/m) | | | 37.4 | 31.0 | 28.4 | 25.2 | 23.8 | 36.2 | 30.7 | 28.9 | 24.7 | 23.8 |
| Discharge stability | | | Nozzle slip-out | ◯ | ◯ | ◯ | ◯ | Δ | ◯ | ◯ | ◯ | ◯ | Δ |
| | | | Ligament length | X | ◯ | ◯ | ◯ | ◯ | X | ◯ | ◯ | ◯ | ◯ |

HEAA: N-hydroxyethylacrylamide [HEAA (ethylenic double bond/one molecule: one), manufactured by KJ Chemicals Corporation]

ACMO: Acryloylmorpholine [ACMO (ethylenic double bond/one molecule: one), manufactured by KJ Chemicals Corporation]

PPG-1000: Polypropylene glycol [UNIOL D1000 (molecular weight 1000), manufactured by NOF CORPORATION]

PEG-400: Polyethylene glycol [PEG#400 (molecular weight 400), manufactured by NOF CORPORATION]

DAROCURE TPO: 2,4,6-Trimethylbenzoyl-diphenyl-phosphine oxide [DERO CURE TPO, manufactured by BASF company]

IRGACURE907: 2-Methyl-1-[4-(methylthio)phenyl]-2-morpholinopropane-1-one [IRGACURE 907, manufactured by Ciba company]

Chivacure ITX: Isopropylthioxanthone [Chivacure ITX, manufactured by Double Bond Chemical Ind., Co., Ltd.]

BYK-307: Silicone-based compound having a polydimethylcyclohexane structure [BYK-307, manufactured by BYK-Chemie company]

MTG: Triethylene glycol monomethyl ether [MPG, manufactured by NIPPON NYUKAZAI CO., LTD.]

DPMA: Dipropylene glycol methyl ether acetate [DAWA-NOL DPMA, manufactured by The Dow Chemical Company]

<Method of Measuring Surface Tension>

As the surface tension of each resin composition for a modeling material of M1 to M15 shown in Table 2 and each resin composition for a supporting material of S1 to S10 shown in Table 3, at 25° C., a value after 20 seconds from measurement initiation was measured using Full Automatic Equilibrium Electro Surface Tension Meter ESB-V (manufactured by Kyowa Interface Science Co., Ltd.). The measurement results are shown in Table 2 and Table 3.

<Method of Assessing Discharge Stability>

Discharge stability of each composition for a modeling material of M1 to M15 shown in Table 2 and each resin composition for a supporting material of S1 to S10 shown in Table 3 was assessed by calculating the ratio of generation of nozzle slip-out, and the ligament length.

(Ratio of Generation of Nozzle Slip-Out)

By performing continuous discharge under the conditions of a nozzle diameter: 20 μm, a flying speed: 7 m/sec, a discharge frequency: 10 kHz, and a continuous discharge time: 5 min, a nozzle check pattern was printed, and the number of nozzles in which nozzle slip-out was generated was counted. And, the ratio of generation of nozzle slip-out was assessed based on the following criteria. The assessment results are shown in Table 2 and Table 3. In addition, nozzle slip-out refers to the state where an ink is not discharged due to clogging of a nozzle.

○: Nozzle slip-out 0%

Δ: Nozzle slip-out more than 0% to less than 5% x: Nozzle slip-out 5% or more (Ligament Length)

Discharge was performed under the conditions of a nozzle diameter: 20 μm, a flying speed: 7 m/sec. and a discharge frequency: 1 kHz, the time from passing of the head of liquid droplets until passing of the tail end of liquid droplets was measured at a position of 1 mm distance from the nozzle, and thereafter, the ligament length was calculated by integrating the time and the flying speed. And, the ligament length was assessed based on the following criteria. The assessment results are shown in Table 2 and Table 3. In addition, the ligament length refers to the length of a liquid droplet which is discharged from a nozzle. When the ligament length is great, ink mist becomes easy to be generated.

○: Ligament length less than 300 μm

Δ: Ligament length 300 to 500 μm x: Ligament length more than 500 μm

In addition, in the present description, the resin composition in which assessment of the ratio of generation of nozzle slip-out was "○", and assessment of the ligament length was "○" was determined to be excellent in discharge stability. Additionally, the resin composition having another assessment was determined to be inferior in discharge stability.

As seen from Table 2, resin compositions for a modeling material of M2 to M4, M7 to M9, and M11 to M15 in which the surface tension Mt is 26.0 to 33.0 mN/m are excellent in discharge stability. Additionally, as seen from Table 3, resin compositions for a supporting material of S2 to S4, and S7 to S9 in which the surface tension St is 24.0 to 33.0 mN/m are excellent in discharge stability.

<Method of Assessing Bleeding>

Using each resin composition for a modeling material of M1 to M15 shown in Table 2 and each resin composition for a supporting material of S1 to S10 shown in Table 3, bleeding was assessed by the same method as that described above. The results are shown in Table 4 and Table 5.

TABLE 4

| Test No | Resin composition for modeling material | Resin composition for supporting material | Bleeding assessment |
| --- | --- | --- | --- |
| 1 | M1 (33.2) | S1 (37.4) | X [M→S] |
| 2 |  | S2 (31.0) | ○ |
| 3 |  | S3 (28.4) | ○ |
| 4 |  | S4 (25.2) | X [S→M] |
| 5 |  | S5 (23.8) | X [S→M] |
| 6 |  | S6 (36.2) | X [M→S] |
| 7 |  | S7 (30.7) | ○ |
| 8 |  | S8 (28.9) | ○ |
| 9 |  | S9 (24.7) | X [S→M] |
| 10 |  | S10 (23.8) | X [S→M] |
| 11 | M2 (31.5) | S1 (37.4) | X [M→S] |
| 12 |  | S2 (31.0) | ○ |
| 13 |  | S3 (28.4) | ○ |
| 14 |  | S4 (25.2) | X [S→M] |
| 15 |  | S5 (23.8) | X [S→M] |
| 16 |  | S6 (36.2) | X [M→S] |
| 17 |  | S7 (30.7) | ○ |
| 18 |  | S8 (28.9) | ○ |
| 19 |  | S9 (24.7) | X [S→M] |
| 20 |  | S10 (23.8) | X [S→M] |
| 21 | M3 (29.6) | S1 (37.4) | X [M→S] |
| 22 |  | S2 (31.0) | X [M→S] |
| 23 |  | S3 (28.4) | ○ |
| 24 |  | S4 (25.2) | ○ |
| 25 |  | S5 (23.8) | X [S→M] |
| 26 |  | S6 (36.2) | X [M→S] |
| 27 |  | S7 (30.7) | X [M→S] |
| 28 |  | S8 (28.9) | ○ |
| 29 |  | S9 (24.7) | ○ |
| 30 |  | S10 (23.8) | X [S→M] |
| 31 | M4 (26.3) | S1 (37.4) | X [M→S] |
| 32 |  | S2 (31.0) | X [M→S] |
| 33 |  | S3 (28.4) | X [M→S] |
| 34 |  | S4 (25.2) | ○ |
| 35 |  | S5 (23.8) | ○ |
| 36 |  | S6 (36.2) | X [M→S] |
| 37 |  | S7 (30.7) | X [M→S] |
| 38 |  | S8 (28.9) | X [M→S] |
| 39 |  | S9 (24.7) | ○ |
| 40 |  | S10 (23.8) | ○ |

TABLE 4-continued

| Test No | Resin composition for modeling material | Resin composition for supporting material | Bleeding assessment |
|---|---|---|---|
| 41 | M5 (23.7) | S1 (37.4) | X [M→S] |
| 42 | | S2 (31.0) | X [M→S] |
| 43 | | S3 (28.4) | X [M→S] |
| 44 | | S4 (25.2) | X [M→S] |
| 45 | | S5 (23.8) | X [M→S] |
| 46 | | S6 (36.2) | X [M→S] |
| 47 | | S7 (30.7) | X [M→S] |
| 48 | | S8 (28.9) | X [M→S] |
| 49 | | S9 (24.7) | X [M→S] |
| 50 | | S10 (23.8) | X [M→S] |
| 51 | M6 (34.1) | S1 (37.4) | X [M→S] |
| 52 | | S2 (31.0) | ○ |
| 53 | | S3 (28.4) | X [S→M] |
| 54 | | S4 (25.2) | X [S→M] |
| 55 | | S5 (23.8) | X [S→M] |
| 56 | | S6 (36.2) | X [M→S] |
| 57 | | S7 (30.7) | ○ |
| 58 | | S8 (28.9) | X [S→M] |
| 59 | | S9 (24.7) | X [S→M] |
| 60 | | S10 (23.8) | X [S→M] |
| 61 | M7 (31.8) | S1 (37.4) | X [M→S] |
| 62 | | S2 (31.0) | ○ |
| 63 | | S3 (28.4) | ○ |
| 64 | | S4 (25.2) | X [S→M] |
| 65 | | S5 (23.8) | X [S→M] |
| 66 | | S6 (36.2) | X [M→S] |
| 67 | | S7 (30.7) | ○ |
| 68 | | S8 (28.9) | ○ |
| 69 | | S9 (24.7) | X [S→M] |
| 70 | | S10 (23.8) | X [S→M] |
| 71 | M8 (30.1) | S1 (37.4) | X [M→S] |
| 72 | | S2 (31.0) | X [M→S] |
| 73 | | S3 (28.4) | ○ |
| 74 | | S4 (25.2) | ○ |
| 75 | | S5 (23.8) | X [S→M] |
| 76 | | S6 (36.2) | X [M→S] |
| 77 | | S7 (30.7) | X [M→S] |
| 78 | | S8 (28.9) | ○ |
| 79 | | S9 (24.7) | X [S→M] |
| 80 | | S10 (23.8) | X [S→M] |
| 81 | M9 (26.7) | S1 (37.4) | X [M→S] |
| 82 | | S2 (31.0) | X [M→S] |
| 83 | | S3 (28.4) | X [M→S] |
| 84 | | S4 (25.2) | ○ |
| 85 | | S5 (23.8) | ○ |
| 86 | | S6 (36.2) | X [M→S] |
| 87 | | S7 (30.7) | X [M→S] |
| 88 | | S8 (28.9) | X [M→S] |
| 89 | | S9 (24.7) | ○ |
| 90 | | S10 (23.8) | ○ |
| 91 | M10 (25.1) | S1 (37.4) | X [M→S] |
| 92 | | S2 (31.0) | X [M→S] |
| 93 | | S3 (28.4) | X [M→S] |
| 94 | | S4 (25.2) | X [M→S] |
| 95 | | S5 (23.8) | ○ |
| 96 | | S6 (36.2) | X [M→S] |
| 97 | | S7 (30.7) | X [M→S] |
| 98 | | S8 (28.9) | X [M→S] |
| 99 | | S9 (24.7) | ○ |
| 100 | | S10 (23.8) | ○ |

* The figure in parentheses indicates a value of surface tension (mN/m).

TABLE 5

| Test No | Resin composition for modeling material | Resin composition for supporting material | Bleeding assessment |
|---|---|---|---|
| 101 | M11 (29.4) | S3 (28.4) | ○ |
| 102 | | S8 (28.9) | ○ |
| 103 | M12 (29.5) | S3 (28.4) | ○ |
| 104 | | S8 (28.9) | ○ |
| 105 | M13 (29.2) | S3 (28.4) | ○ |
| 106 | | S8 (28.9) | ○ |
| 107 | M14 (29.6) | S3 (28.4) | ○ |
| 108 | | S8 (28.9) | ○ |
| 109 | M3 (29.6) | S3 (28.4) | ○ |
| 110 | | S8 (28.9) | ○ |
| 111 | M15 (29.8) | S3 (28.4) | ○ |
| 112 | | S8 (28.9) | ○ |

* The figure in parentheses indicates a value of surface tension (mN/m).

As seen from the results of Table 4, in the resin compositions for a modeling material and the resin compositions for a supporting material of test Nos. 2, 3, 7, 8, 12, 13, 17, 18, 23, 24, 28, 29, 34, 35, 39, 40, 52, 57, 62, 63, 67, 68, 73, 74, 78, 84, 85, 89, 90, 95, 99 and 100 satisfying all requirements of the present invention, an interface between the layer composed of the resin composition for a modeling material and the layer composed of the resin composition for a supporting material became linear when viewed from the top, and bleeding was not generated.

On the other hand, in the resin compositions for a modeling material and the resin compositions for a supporting material of test Nos. 1, 6, 11, 16, 21, 22, 26, 27, 31 to 33, 36 to 38, 41 to 51, 56, 61, 66, 71, 72, 76, 77, 81 to 83, 86 to 88, 91 to 94, and 96 to 98 in which the surface tension Mt of the resin composition for a modeling material is smaller than the surface tension St of the resin composition for a supporting material, that is, a difference between the surface tension Mt and the surface tension St (Mt−St) is 0 or less, by movement of the resin composition for a modeling material to a side of the resin composition for a supporting material, at an interface between the layer composed of the resin composition for a modeling material and the layer composed of the resin composition for a supporting material, bleeding was generated.

Additionally, in the resin compositions for a modeling material and the resin compositions for a supporting material of test Nos. 4, 5, 9, 10, 14, 15, 19, 20, 25, 30, 53 to 55, 58 to 60, 64, 65, 69, 70, 75, 79 and 80 in which a difference between the surface tension Mt of the resin composition for a modeling material and the surface tension St of the resin composition for a supporting material is 5 or more, by movement of the resin composition for a supporting material to a side of the resin composition for a modeling material, at an interface between the layer composed of the resin composition for a modeling material and the layer composed of the resin composition for a supporting material, bleeding was generated.

Figure 5:
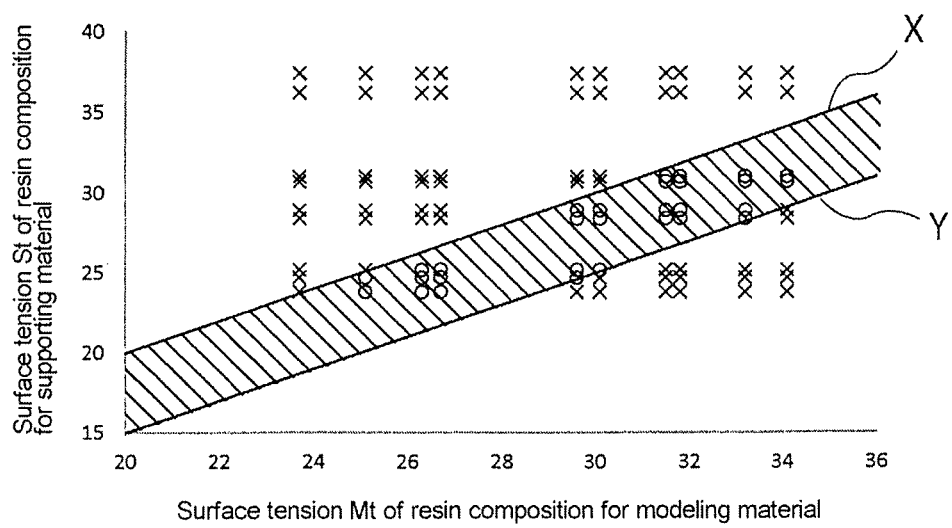
FIG. 5 is a graph plotting surface tension Mt of a resin composition for a modeling material and surface tension St of a resin composition for a supporting material of test Nos. 1 to 100.

FIG. 5 is a graph plotting the surface tension Mt of the resin compositions for a modeling material and the surface tension St of the resin compositions for a supporting material of test Nos. 1 to 100. In FIG. 5, a test in which bleeding assessment was "○" is indicated by "○", and a test in which bleeding assessment was "x [M→S]" or "x [S→M]" is indicated by "x". As seen from FIG. 5, when Mt and St are within a region positioned between a straight line X and a straight line Y (provided that a position on a straight line X and a straight line Y is excluded), bleeding is not generated in the resin compositions for a modeling material and the resin compositions for a supporting material.

As seen from the results of Table 5, in the resin compositions for a modeling material and the resin compositions for a supporting material of test Nos. 101 to 112 satisfying all requirements of the present invention, an interface between the layer composed of the resin composition for a modeling material and the layer composed of the resin composition for a supporting material became linear, and bleeding was not generated. That is, in the resin compositions for a modeling material and the resin compositions for a supporting material satisfying all requirements of the present invention, even when the coloring agent is not contained, or a kind of the coloring agent was changed, bleeding is not generated.

As shown in Table 1, when bleeding is not generated at an interface between the layer composed of the resin composition for a modeling material and the layer composed of the resin composition for a supporting material, a light cured article having the good dimensional accuracy is obtained. On the other hand, when bleeding is generated at an interface between the layer composed of the resin composition for a modeling material and the layer composed of the resin composition for a supporting material, the dimensional accuracy of a light cured article is reduced. Accordingly, since in the resin compositions for a modeling material and the resin compositions for a supporting material of test Nos. 2, 3, 7, 8, 12, 13, 17, 18, 23, 24, 28, 29, 34, 35, 39, 40, 52, 57, 62, 63, 67, 68, 73, 74, 78, 84, 85, 89, 90, 95, 99, and 100 to 112 satisfying all requirements of the present invention, at an interface between the layer composed of the resin composition for a modeling material and the layer composed of the resin composition for a supporting material, bleeding was not generated, a light cured article having the good dimensional accuracy is obtained. On the other hand, since in the resin compositions for a modeling material and the resin compositions for a supporting material of test Nos. 1, 4 to 6, 9 to 11, 14 to 16, 19 to 22, 25 to 27, 30 to 33, 36 to 38, 41 to 51, 53 to 56, 58 to 61, 64 to 66, 69 to 72, 75 to 77, 79 to 83, 86 to 88, 91 to 94, and 96 to 98 not satisfying the requirements of the present invention, at an interface between the layer composed of the resin composition for a modeling material and the layer composed of the resin composition for a supporting material, bleeding was generated, the dimensional accuracy of a light cured article is reduced.

Other Embodiments

The method for manufacturing a light cured article of the above-mentioned embodiment may further comprise a step of discharging only a resin composition for a modeling material from an ink-jet head so that only a layer composed of the resin composition for a modeling material is formed, thereafter, photocuring the resin composition for a modeling material constituting the layer, thereby, obtaining a modeling material and/or a step of discharging only a resin composition for a supporting material from an ink-jet head so that only a layer composed of the resin composition for a supporting material is formed, thereafter, photocuring the resin composition for a supporting material constituting the layer, thereby, obtaining a supporting material.

INDUSTRIAL APPLICABILITY

The light curing molding ink set of the present invention can afford a light cured article having the good dimensional accuracy. Hence, the light curing molding ink set of the present invention can be suitably used in manufacturing a light cured article by a manufacturing method for light curing molding using an ink-jet scheme.

The invention claimed is:

1. A light curing molding ink set used for a manufacturing method for light curing molding using an ink-jet scheme, comprising a combination of a resin composition for a modeling material used for shaping the modeling material and a resin composition for a supporting material used for shaping the supporting material, wherein surface tension Mt (mN/m) of the resin composition for a modeling material is greater than surface tension St (mN/m) of the resin composition for a supporting material, and the surface tension Mt and the surface tension St satisfy the following (i) expression:

$$0 < Mt - St < 5 \qquad (i).$$

2. The light curing molding ink set according to claim 1, wherein the surface tension Mt is 26.0 to 33.3 mN/m.

3. The light curing molding ink set according to claim 1, wherein the resin composition for a modeling material contains a water-insoluble monofunctional ethylenic unsaturated monomer (A), a di- or more-functional polyfunctional ethylenic unsaturated monomer (B), a photopolymerization initiator (C), and a surface adjusting agent (D).

4. The light curing molding ink set according to claim 3, wherein a content of the water-insoluble monofunctional ethylenic unsaturated monomer (A) is 19 to 49 parts by weight, based on 100 parts by weight of the whole resin composition for a modeling material.

5. The light curing molding ink set according to claim 3, wherein a content of the di- or more-functional polyfunctional ethylenic unsaturated monomer (B) is 15 to 60 parts by weight, based on 100 parts by weight of the whole resin composition for a modeling material.

6. The light curing molding ink set according to claim 3, wherein a content of the water-insoluble monofunctional ethylenic unsaturated monomer (A) is 19 to 49 parts by weight, based on 100 parts by weight of the whole resin composition for a modeling material, and a content of the di- or more-functional polyfunctional ethylenic unsaturated monomer (B) is 15 to 60 parts by weight, based on 100 parts by weight of the whole resin composition for a modeling material.

7. The light curing molding ink set according to claim 3, wherein the resin composition for a modeling material further contains an oligomer.

8. The light curing molding ink set according to claim 7, wherein a content of the oligomer is 10 to 45 parts by weight, based on 100 parts by weight of the whole resin composition for a modeling material.

9. The light curing molding ink set according to claim 1, wherein the surface tension St is 24.0 to 33.0 mN/m.

10. The light curing molding ink set according to claim 1, wherein the resin composition for a supporting material contains a water-soluble monofunctional ethylenic unsaturated monomer (E), polyalkylene glycol comprising an oxyethylene group and/or an oxypropylene group (F), a photopolymerization initiator (C), and a surface adjusting agent (D).

11. The light curing molding ink set according to claim 10, wherein a content of the water-soluble monofunctional ethylenic unsaturated monomer (E) is 20 to 50 parts by weight, based on 100 parts by weight of the whole resin composition for a supporting material.

12. The light curing molding ink set according to claim 10, wherein a content of the oxyethylene group and/or an oxypropylene group (F) is 20 to 49 parts by weight, based on 100 parts by weight of the whole resin composition for a supporting material.

13. The light curing molding ink set according to claim 10, wherein a content of the water-soluble monofunctional ethylenic unsaturated monomer (E) is 20 to 50 parts by weight, based on 100 parts by weight of the whole resin composition for a supporting material, and a content of the oxyethylene group and/or an oxypropylene group (F) is 20 to 49 parts by weight, based on 100 parts by weight of the whole resin composition for a supporting material.

14. The light curing molding ink set according to claim 10, wherein a number average molecular weight Mn of the oxyethylene group and/or an oxypropylene group (F) is 100 to 5,000.

15. A method for manufacturing a light cured article using the light curing molding ink set as defined in claim 1 by a manufacturing method for light curing molding using an ink-jet scheme, comprising:

a step (I) of discharging a resin composition for a modeling material and a resin composition for a supporting material from an ink-jet head, so that a resin composition layer in which a layer composed of the resin composition for a modeling material and a layer composed of the resin composition for a supporting material are arranged contiguously, a step (II) of photocuring the resin composition for a modeling material and the resin composition for a supporting material constituting the resin composition layer, respectively, thereby, obtaining a modeling material and a supporting material, and a step (III) of removing the supporting material, thereby, obtaining a light cured article.

\* \* \* \* \*